(12) United States Patent
O'Neal et al.

(10) Patent No.: US 6,639,975 B1
(45) Date of Patent: Oct. 28, 2003

(54) INTERACTIVE BILLING CONTROL SYSTEM

(75) Inventors: Stephen C. O'Neal, San Francisco, CA (US); G. Alex Terry, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/268,525

(22) Filed: Mar. 11, 1999

Related U.S. Application Data

(63) Continuation-in-part of application No. 09/240,893, filed on Jan. 29, 1999.

(51) Int. Cl.⁷ .............................................. H04M 15/00
(52) U.S. Cl. ............................ 379/112.01; 379/114.03; 379/121.03; 379/126; 379/116; 379/119
(58) Field of Search ............................ 379/111, 112.01, 379/112.04, 112.06, 114.01, 114.03, 114.06–114.09, 114.14, 114.15–114.22, 114.23–114.25, 115.01–115.02, 120–121.05, 126–127.05

(56) References Cited

U.S. PATENT DOCUMENTS

| | | | | |
|---|---|---|---|---|
| 5,864,613 A | * | 1/1999 | Flood | |
| 5,983,218 A | * | 11/1999 | Syeda-Mahmood | |
| 6,188,752 B1 | * | 2/2001 | Lesley | |
| 6,377,993 B1 | * | 4/2002 | Brandt et al. | |

* cited by examiner

*Primary Examiner*—Duc Nguyen
(74) *Attorney, Agent, or Firm*—Senniger, Powers, Leavitt & Roedel

(57) ABSTRACT

An apparatus and method are provided for controlling access to a telecommunications and messaging services system from a server computer that has a web browser installed. The apparatus includes a billing server that maintains a database of telecommunications transaction records. Each time a new telecommunications event occurs, such as a toll call from a number in a user's account, a new transaction record is added to the data base. A service provider interfaces to the database of transaction records through a series of web pages that are transmitted over the internet by a web server. The web pages that are generated by the web server provide the service provider with the capabilty to periodically query the data base to detect the occurrence of a prescribed account event, such as exceeding a charge credit limit. Upon detection of the prescribed account event, messages are sent to the web server to control access to the telecommunications and messaging services system for a corresponding account.

58 Claims, 12 Drawing Sheets

*Event Monitor Details*

*Method for Interactive Billing Access Via Thin Web Client*

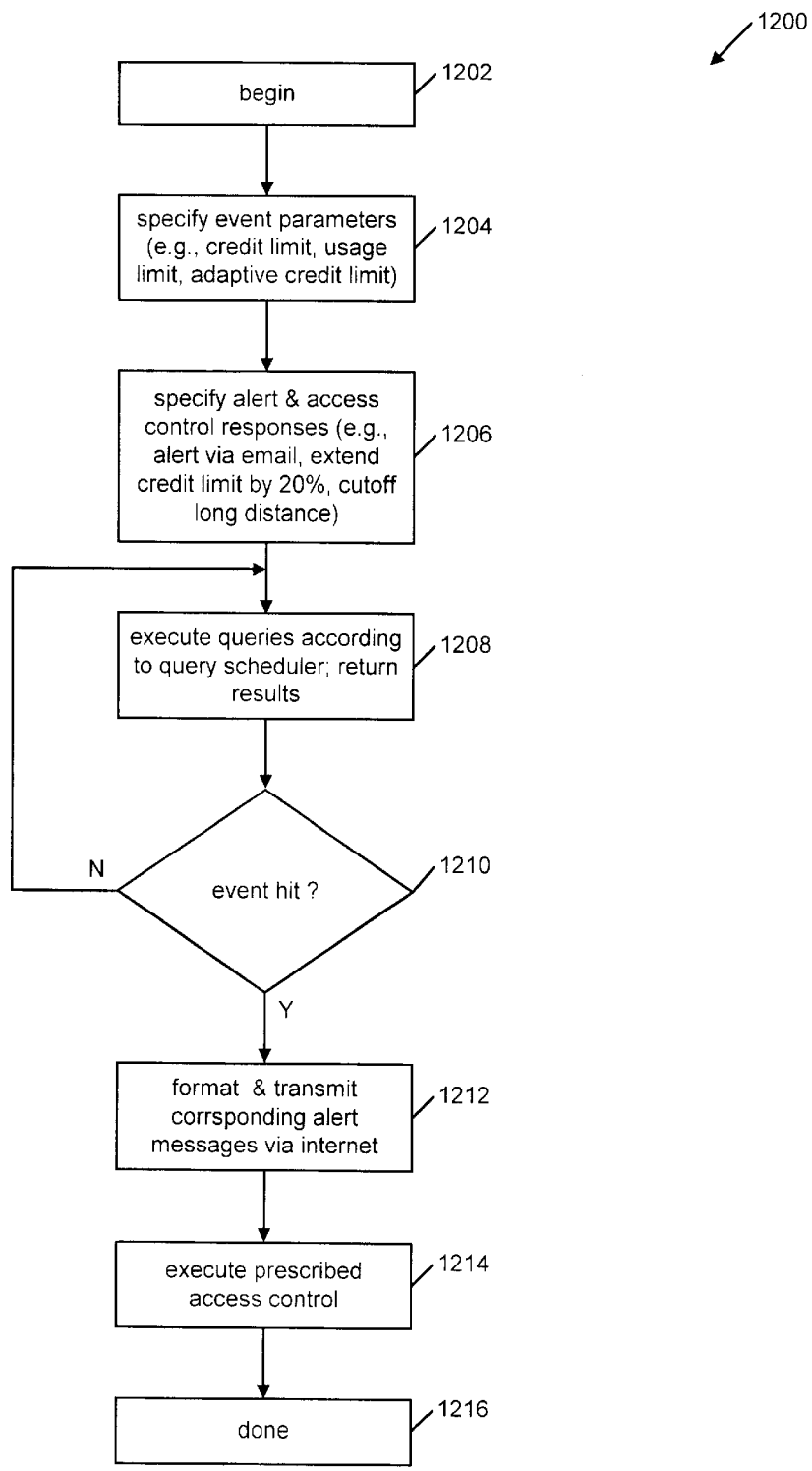

INTERACTIVE BILLING CONTROL SYSTEM

CROSS-REFERENCE TO RELATED APPLICATIONS

This application is a continuation-in-part of copending U.S. patent application Ser. No. 09/240,893, entitled INTERACTIVE BILLING SYSTEM UTILIZING A THIN WEB CLIENT INTERFACE, having the same inventors and being filed on Jan. 29, 1999.

This application is related to the following co-pending U.S. Patent Applications that are hereby incorporated by reference:

(i) U.S. patent application Ser. No. 09/239,560 entitled "Integrated Message Storage and Retrieval System Distributed Over a Large Geographical Area" and filed Jan. 29, 1999 (now abandoned);

(ii) U.S. patent application Ser. No. 09/240,367 entitled "A System And Method For Providing Unified Messaping to a User With a Thin Web Browser" and filed Jan. 29, 1999 (Issued Jun. 25, 2002 as U.S. Pat. No. 6,411,685);

(iii) U.S. patent application Ser. No. 09/239,585 entitled "Centralized Communication Control Center for Visually and Audibly Updating Communication Options Associated with Communication Services of a Unified Messaging System And Methods Therefor" and filed Jan. 29, 1999 (Issued Jul. 17, 2001 as U.S. Pat. No. 6,263,064);

(iv) U.S. patent application Ser. No. 09/239,584 entitled "Computer-implemented Call Forwarding Options And Methods Therefor in a Unified Messaging System" and filed Jan. 29, 1999 (Issued Oct. 8, 2002 as U.S. Pat. No. 6,463,145);

(v) U.S. patent application Ser. No. 09/240,893 entitled "Interactive Billing System Utilizing a Thin Web Client Interface" and filed Jan. 29, 1999.

(vi) U.S. patent application Ser. No. 09/240,368 entitled "A System And Method to Manage Phone Sourced Messages" and filed Jan. 29, 1999 (now abandoned);

(vii) U.S. patent application Ser. No. 09/240,434 entitled "Method And Apparatus For Network Independent Initiation of Telephony" and filed Jan. 29, 1999;

(viii) U.S. patent application Ser. No. 09/240,435 entitled "Apparatus And Method For Device Independent Messaging Notification" and filed Jan. 29, 1999;

(ix) U.S. patent application Ser. No. 09/240,436 entitled "Apparatus and Method for Channel-transparent Multimedia Broadcast Messaging" and filed Jan. 29, 1999 (now abandoned).

(x) U.S. patent application Ser. No. 09/239,589, entitled "Voice Access Through a Data-Centric Network To An Integrated Message Storage and Retrieval System" and filed Jan. 29, 1999 (allowed).

DEFINITION OF TERMS

Data-centric network: a network that carries digital data, primarily to facilitate information exchange among computers and computer peripherals. Examples include distributed computer networks such as the Internet.

Telephony-centric network: a network that carries telephony information such as voice, fax, page messages, and the like, primarily to facilitate information exchange among telephony devices.

Message: a communication which may be transmitted via either the data-centric network or the telephony-centric network. Examples include voicemail, electronic mail (email), facsimile (fax), page, and the like.

Telecommunication device: POTS telephone, cellular telephone, satellite telephone, web telephone, PC (desktop and laptop), web surfer, personal digital assistant (PDAs), facsimile machine, teletype, modem, video telephone, set top telephone.

Web telephone: a telephone implemented via a computer that is coupled to the data-centric network. An example is a PC with microphone, speaker and internet connection.

Set top telephone: a telephone set coupled to a cable-based set top box, bypassing the local telco provider. The cable-based system may be provided by, for example, WebTV, TCI cablevision.

Web surfer: an Internet-ready PC with a network connection and pre-installed web browser.

PDA: personal digital assistant, e.g., Palm Pilot available from 3COM.

Thin Web Client: A commonly employed web browser such as Internet Explorer or Netscape Navigator—JAVA enabled.

PSTN: Public Service Telephony-centric network, e.g., AT&T, MCI, Sprint-owned telco.

GUI: graphic user interface

POTS: plain old telephone service

NOC: Network Operations Center

POP: point of presence, e.g., co-location at a local telco switch or at a company controlled area with T1 connections to a local switch.

WPOP: Web POP

VPOP: Voice POP

BACKGROUND OF THE INVENTION

1. Field of the Invention

This invention relates in general to the field of telecommunications services billing, and more particularly to an apparatus and method for controlling access to telecommunications and messaging services associated with a customer account.

2. Description of the Related Art

The advent of the telephone at the turn of the century presented a new form of communicating to the population at large. Whereas prior communications between individuals occurred either in person or through the mail, the introduction of the telephone into both the household and business cultures changed the way that people work, play, and interact. More urgent matters were treated immediately with a telephone call while less important matters were relegated to the mail.

Initially, the coverage of the telephony-centric network allowed a user to make local calls only, and that with intervention of an operator. Early use was therefore limited. As coverage of the telephony-centric network began to connect major regions of the country together, long distance calling became an option. Yet, this option as well enjoyed only limited use by the population at large, primarily because of the cost involved with making a long distance, or toll, call. When a toll call was made, because the user had to interact with an operator in order to place the call, he/she was aware of the costs involved.

Direct dialing technology took the operator out of the toll calling loop. As a result, the cost for making a toll call was reduced extensively. More and more users began treating long distance telecommunications as the commodity it has become today. As a consequence of increased use, it became vital for prudent household/business money managers to analyze and reconcile each month's long distance bill. As in any other venture for profit, the management of bottom line costs is effected by careful scrutiny of the details. Early long distance bills were not difficult to analyze because 1) there was only one long distance vendor; and 2) most businesses and households only had one telephone line.

Two parallel progressions over the past 20 year have simply revolutionized personal and business telecommunications practices. The first progression was the introduction of competition into the telecommunications marketplace. Today, literally hundreds of telecommunications companies advertise over the full gamut of telecommunications services. In any given area of the United States, a user can choose from at least 25 long distance service providers. Competition has resulted in the dramatically low cost of long distance that is seen today. Long distance calls are now billed by the minute, and cost less than 10 cents per minute.

The proliferation of computer technologies in both the telecommunications industry and by telecommunications subscribers is the second progression in recent history to transform personal and business practice. Facsimile machines, pagers, multi-line telephone systems, voice mail, cellular telephones, and computer networking over the internet are now ubiquitously employed in average households and businesses. It is not uncommon today to find, numerous telephone lines in a given home, some for personal use, some for business use, each replete with a cornucopia of features provided by numerous telecommunications service companies.

But while competition and technological advances have made telecommunications services more accessible and affordable, both of these two progressions have exponentially exacerbated the money management problem. In the 1980's, as these two progressions were still in their early stages, the average subscriber would receive a separate bill from each provider for each line every month. All of the providers, because they were part of the overall telecommunications network, communicated with local telephony-centric network interface equipment each time a call was placed. Details of the call, or transaction, would be recorded so that an itemized bill would result at the end of the billing period. Consequently, a subscriber having two lines, one with Long Distance Company A and the other with Long Distance Company B, would receive a bill each month from each of the companies.

Service providers over the next few years took the initiative to negotiate shared billing agreements with local telephone companies to reduce the burden on the consumer. Today, a subscriber receives one monthly bill for telecommunications services. This consolidated bill presents all charges for lines within the subscriber's household/business and additionally itemizes each charge. Consolidated billing techniques allow a present day money manager to more easily analyze and reconcile telecommunications costs-that is, ex post facto. This is because a consolidated bill typically itemizes charges for telecommunications services that have occurred over the previous 30 days.

Because telecommunications assets and services can be easily accessed, they also can be easily abused. For instance, newspapers routinely contain reports about some business or family that received a horrendously large phone bill as a result of an abuse such as a pirated calling card or excessive access of a 900 number. Accordingly, prudent money managers are now demanding up-to-date information as well as detailed information in order to better control costs and to precipitate abusive use patterns.

The problem of cost control cuts both ways: it is advantageous for a user to stay up to date regarding activity pertaining to his account. However, cost control is also a great concern to service providers. Unfortunately, overcharging, overuse, and payment default by some customers are manifestations of the same issue as seen from the service provider perspective. And because services providers also incur out of pocket costs due to any of the service abuses listed above, it is also incumbent upon a prudent billing manager for a service provider to stay on top account activity to detect and control overcharges by negligent users or direct criminal abuse.

Many telecommunications service providers today allow a user or billing manager to access account information over the internet via a web browser, yet the information that is provided online is at a summary level only (i.e., total charges) and is furthermore merely a reflection of costs that were provided in a previous consolidated bill. In summary, present day online telecommunications billing and cost control systems provide no meaningful benefits to a user other than presenting an unpretentious reminder to pay an outstanding balance or that abuses have already transpired.

Therefore, what is needed is an apparatus that allows a service provider to monitor up-to-date telecommunications charges for a consolidated account via a web browser.

In addition, what is needed is an apparatus whereby a service provider can set a credit limit for charges to a particular telecommunications and messaging services account via a web browser and automatically terminate access to specified services once the credit limit has been exceeded.

Furthermore, what is needed is an online access control mechanism that allows a service provider to automatically alert a customer that a prescribed account event, such as unusual calling activity, has recently been detected on the customer's account.

Moreover, what is needed is a method for prescribing account events and corresponding control responses for a telecommunications and messaging services account from a server computer over the internet.

SUMMARY

To address the above-detailed deficiencies, it is a feature of the present invention to provide an mechanism in a telecommunications and messaging services system that allows a service provider to control up-to-date telecommunications charges for a consolidated account via a web browser.

Accordingly, in the attainment of the aforementioned feature, the present invention provides an apparatus for controlling access to a telecommunications and messaging services system. The apparatus includes a billing server and a web server. The billing server maintains telecommunication transaction records and periodically queries the telecommunication transaction records to detect an account event. The web server is coupled to the billing server. The web server sends telecommunication transaction information to the billing server, it prescribes the account event in response to a command via a thin web client interface, and, upon detection of the account event, it controls access to the telecommunications and messaging services system for a corresponding account.

A benefit of the present invention is that a billing manager can monitor account details online that are needed to properly control out of pocket expenses for a service provider.

In another aspect, the present invention provides a charge control mechanism for a telecommunications service provider. The charge control mechanism has a billing server and a web server. The billing server maintains transaction records and controls access to telecommunications and messaging services corresponding to an account. The billing server includes data base logic and an event monitor. The data base logic stores the transaction records, where the transaction records specify transaction details and charges corresponding to the account. The event monitor is coupled to the data base logic. The event monitor schedules periodic queries of the transaction records to detect an account event, and, upon detection of the account event, the event monitor initiates a response. The web server is coupled to the billing server. The web server receives commands over a data-centric network prescribing the account event and the response. The commands are entered by a service provider via a web browser.

Another benefit of the present invention is that a service provider does not have to wait for a monthly accounting report to arrive in order to take actions to correct abuses of a telecommunications account.

In a further aspect, the present invention provides an apparatus for monitoring and controlling access to telecommunications and messaging services over the internet from a server computer that is executing a web browser application. The apparatus includes a web server, an event/alert buffer, a query tasker, and an access controller. The web server receives commands from the server computer prescribing an account event and corresponding response. The event/alert buffer is coupled to the web server and maintains parameters that describe the account event and the corresponding response. The query tasker is coupled to the event alert/buffer. The query tasker generates periodic query requests to search a telecommunications transaction data base to detect the account event and initiates a request to execute the corresponding response. The access controller is coupled to the query tasker. The access controller receives the request and executes the corresponding response, thereby controlling access to telecommunications and messaging services associated with a user account.

A further benefit of the present invention is that a billing manager does not require special software applications to control telecommunication charges over the internet associated with a customer account.

In yet another aspect, the present invention provides a method for controlling access to telecommunications and messaging services over the internet from a server computer that is executing a web browser application. The method includes maintaining telecommunications billing records in a data base, the telecommunications billing records documenting individual telecommunication events and associated charges; prescribing an account event and response from the server computer and transmitting the account event and response to a billing computer over the internet; querying the data base in to detect the account event; and, upon detection of the account event, initiating the response.

Yet another benefit of the present invention is that out of pocket losses resulting from negligent payment or system abuses can be automatically contained.

BRIEF DESCRIPTION OF THE DRAWINGS

These and other features, and benefits of the present invention will become better understood with regard to the following description, and accompanying drawings where:

FIG. 12 is a flow chart illustrating a method according to the present invention for monitoring and controlling access to telecommunications and messaging services via a thin web client.

DETAILED DESCRIPTION

In light of the above background on telecommunications billing techniques, several related art examples will now be discussed with reference to FIGS. 1 and 2. These examples illustrate how present day online billing systems for telecommunications services encumber a user in two ways: First, because online access to accounts is provided only at the summary level, the user is prohibited from performing any significant use or cost analyses-a significant function that is regularly performed in a number of small businesses. Second, because present day billing systems update online accounts only at the end of each billing cycle, the user is unable to detect usage and corresponding charges until his/her account is updated. Following this discussion, a detailed description of the present invention will be provided with reference to FIGS. 3 through 12. The present invention provides a user or service provider with online access to detailed, near-real-time ("up to date") transaction data associated with a telecommunications services account. In addition, the service provider is able to monitor and control the user's access based upon account events that are detected from automatically querying the transaction data.

Figure 1:
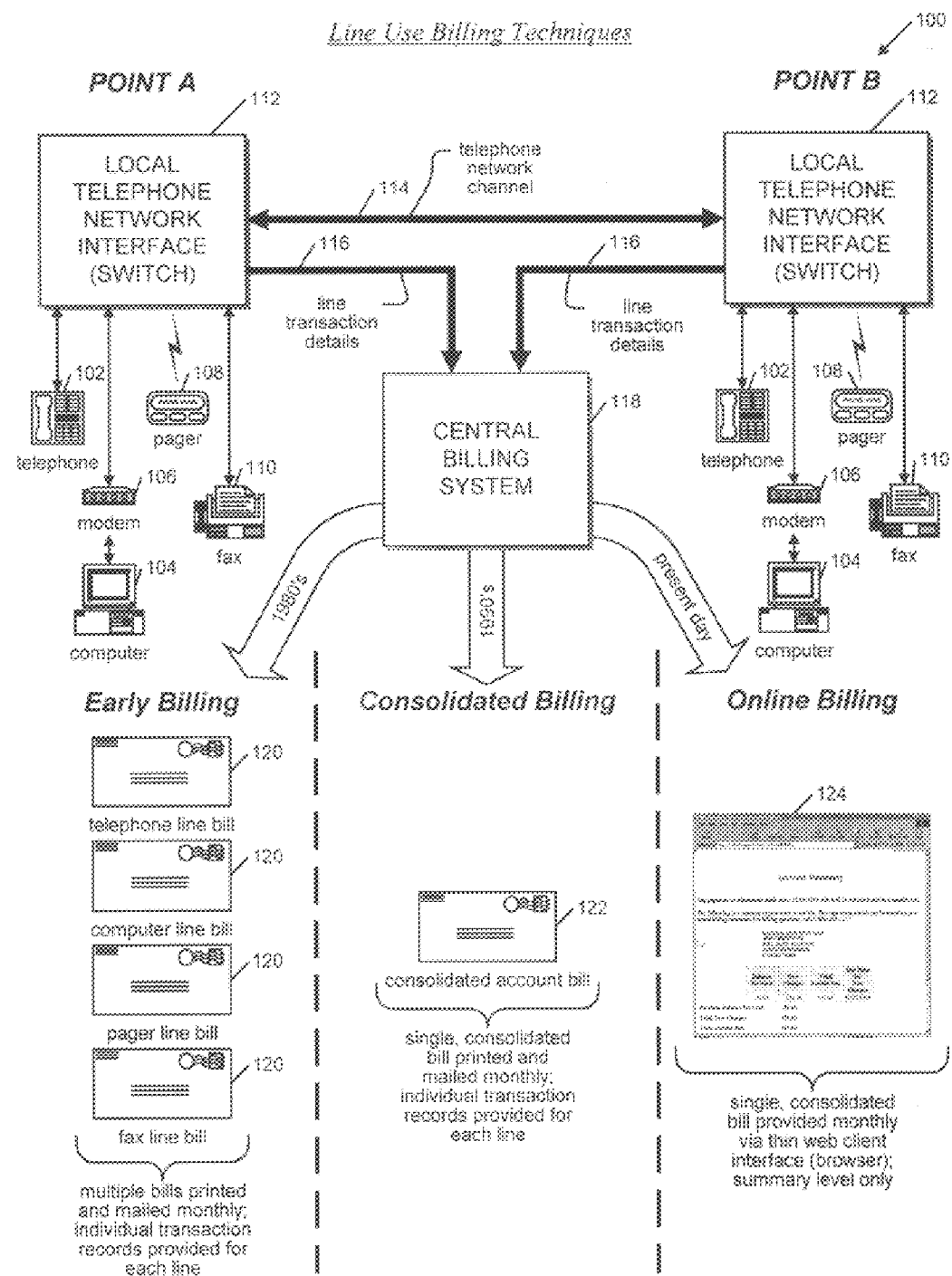
FIG. 1 is a diagram illustrating related art billing techniques for telecommunications services.

Referring to FIG. 1, a diagram 100 is presented illustrating related art billing techniques for telecommunications services. The block diagram 100 shows two local telephony-centric network interfaces 112, one 112 at POINT A and one 112 at POINT B. The block diagram 100 also depicts telecommunication devices connected to the local telephony-centric network interfaces 112: a telephone 102, pager 108, a facsimile (fax) machine 110, and a modem 106 that provides connectivity for a computer 104. In addition, a telecommunications channel 114 connects the two local telephony-centric network interfaces 112. The telecommunications channel 114 represents any of a number of channel mediums in use today for the transmission of telephonic data to include metallic and fiber-optic landline, line-of-sight microwave, and satellite communication channels. The diagram 100 also shows a central billing system 118 that is coupled to both of the local telephony-centric network interfaces 112 via a billing network 116. Furthermore, the diagram 100 illustrates the three evolutionary techniques used by the central billing system 118 to invoice customers: an early technique involving preparation of separate bills 120, a consolidated account technique involving a consolidated bill 122, and an online technique involving online presentation of a bill summary 124.

In operation, each of the devices 102, 108, 110, 106/104 have a unique telephone number, or line number, for addressing and identification by the local telephony-centric network interface 112. The local telephony-centric network interface 112 is also known as a local switch 112. The local switch 112 is the point where local devices 102, 108, 110, 106/104 interface to the telephony-centric network channel 114. A transmitting local device, say a telephone 102 at POINT A, places a call to a compatible receiving device, say a telephone 102 at POINT B, by providing the telephone number assigned to the receiving device 102 at POINT B to the local switch 112 at POINT A. The local switch 112 at POINT A then routes the call to the local switch 112 at POINT B over the telephony-centric network channel 114. The local switch 112 at POINT B then routes the call to the receiving device 102. The placement of the call, through completion of the call, is known as a line transaction, or transaction. A transaction is typically placed between an initiating device, or calling number, and a receiving device, or called number, however, a transaction can also take place between several devices. Such a transaction is known as a conference call.

It is customary in the telecommunications industry to pass along the cost of telecommunications transactions to customers. Often, the cost of local calls is billed to a customer for a flat monthly fee. The cost of some types of calls, say a call to directory assistance, is billed on a per transaction basis. The cost of other types of calls, toll calls, is billed according to call duration, and possibly distance. Moreover, the billing rates associated with all of the above call types are determined based upon a number of complex factors present in a competitive, yet publicly regulated, market environment.

Prior to the 1980's, virtually all of the commercial telecommunications services in the United States were provided by a single telecommunications company. Since the breakup of that telecommunications company, competition in the industry has flourished. In any given city today, a customer can select portions of his/her telecommunication service package from upwards to a 100 different companies. For example, the customer may choose Company A to provide local line service, company B to provide long distance toll service, Company C to provide cellular telephone service, and Company D to provide paging service. Although such competition is healthy, because each of these service providers utilize elements of the telecommunications network 102–114 in whole or in part, a strict accounting of each telecommunication transaction must be maintained so that each of the service providers can properly apportion transaction costs to its customers.

The central billing system 118 is the focal point for transaction accounting. Coupled to each local switch 112 via the billing network 116, typically a high speed data-centric network 116, the central billing system collects data for each telecommunications transaction within its scope of coverage. For example, when a long distance call is placed from a telephone 102 in City X to a telephone 102 in City Y, the central billing system 118 generates and stores a transaction record for the long distance call. Elements of the transaction record generally include calling number (or line number), called number, place called, date and time of the call, and duration of the call. Additionally, each transaction record within the central billing system is mapped to a customer and a service provider for the transaction.

Periodically, each service provider bills its customers for services provided during a given period, the given period typically being a month in duration. The early invoicing technique shown in the diagram 100 was predominantly used during the 1980's and resulted in a series of bills 120 being issued from each service provider. For example, in any given month, Company A would access the central billing system 118 to retrieve transactions earmarked for Company A's services. In turn, Company A would manually print and mail invoices 120 to its customers for payment. A customer would receive an invoice 120 from Company A for each of his/her line numbers and each of the invoices 120 would include individual transaction details as described above in support of the total invoiced amount. Likewise, Company B, Company C, and Company D would issue invoices 120 to their customers. Consequently, a particular individual would receive multiple bills 120 for each line number. Although multiple bills 120 for similar services causes inconvenience, because each of the bills 120 contained detailed transaction information, the customer could at least scrutinize the bills 120 to ensure that unauthorized or duplicate charges were not present. A household or small business in the 1980's normally had one or two lines. At most, this resulted in having to analyze and pay two telecommunications service bills 120 from a single company at the end of each month.

In the late 1990's, it is not uncommon to find information-based cottage industries running entirely out of a home office located in a spare bedroom. As a result of advances in the communications industry, particularly those advances resulting in what is today known as the internet, or world wide web, an individual or small business in the 1990's may have a number of lines: two home lines, a home computer line, a fax line, two to three business lines, a cellular phone line, and a pager line. In addition to the multiplicity of lines, the individual or small business may provision telecommunications services for each of the lines to a different telecommunications service provider. What once was a tolerable analysis and reconciliation exercise at the end of each month quickly became intolerable.

Customer pressure provided the impetus for the telecommunications billing standard in use today: the consolidated bill 122. Now, rather than receiving numerous bills 120 at the end of each month, a telecommunications service customer receives a consolidated bill 122. With rare exception, lines and related services are mapped in the central billing system 118 to a customer account number. At the end of each billing cycle, a consolidated bill 122 is printed and mailed to the customer for payment. The consolidated bill 122 includes sections for each service provider and each section contains subsections for each line in the account. Each line subsection of the consolidated bill 122 contains individual transaction details as described above in support of the total invoiced amount. Hence, rather than analyzing and reconciling multiple telecommunication invoices, a customer need only analyze one, albeit complex, invoice at the end of each month.

Because an increasing number of homes and businesses are connected to the Internet, more recent developments in the industry find a few telecommunications services providers allowing their customers to access billing information online. Yet, because this billing technique is still in its early stages, present day online billing systems actually provide fewer benefits than the consolidated billing technique. In theory, a user ought to be able to access up-to-date transaction details for his/her telecommunications account in a consolidated format. But this is simply not the case.

Instead, what the user is presented with is simply a summary 124 of his/her consolidated bill 122—the consolidated bill 122 is still used as the primary billing vehicle for a consolidated account. The summary 124 is provided as a web page authored in hypertext markup language (HTML).

Most personal computers today are equipped with general purpose internet communication applications known as thin web clients, or web browsers. For example, either Microsoft® Internet Explorer or Netscape® Communicator applications are found on virtually every present day desktop system. Either of these thin web clients is capable of receiving an HTML-authored web page from a server over the internet and displaying contents of the web page for the user on his/her desktop computer. A web browser is also capable of transmitting data input by the user back to the server over the internet. Hence, to access literally millions of different web sites over the internet, the user need only execute a web browser. The responsibility belongs to designers of a particular web site to provide the web pages and processing capabilities required for a user to interact effectively and efficiently with the site, without a constraint that special software be installed on the user's computer.

Although data-centric networks are used extensively in the telecommunications industry for other applications, internetworking techniques and capabilities with regard to billing are present now only in rudimentary forms. One skilled in the art will appreciate that for a telecommunications service provider to provide the online summary 124 shown in FIG. 1 over the internet requires only minor enhancements to the central billing system 118 over that required to print and mail a consolidated bill 122. Furthermore, because the online summary 124 is at a summary level, it is virtually useless for purposes of analysis and reconciliation. The present day online summary billing technique is more specifically described with reference to FIG. 2.

Figure 2:
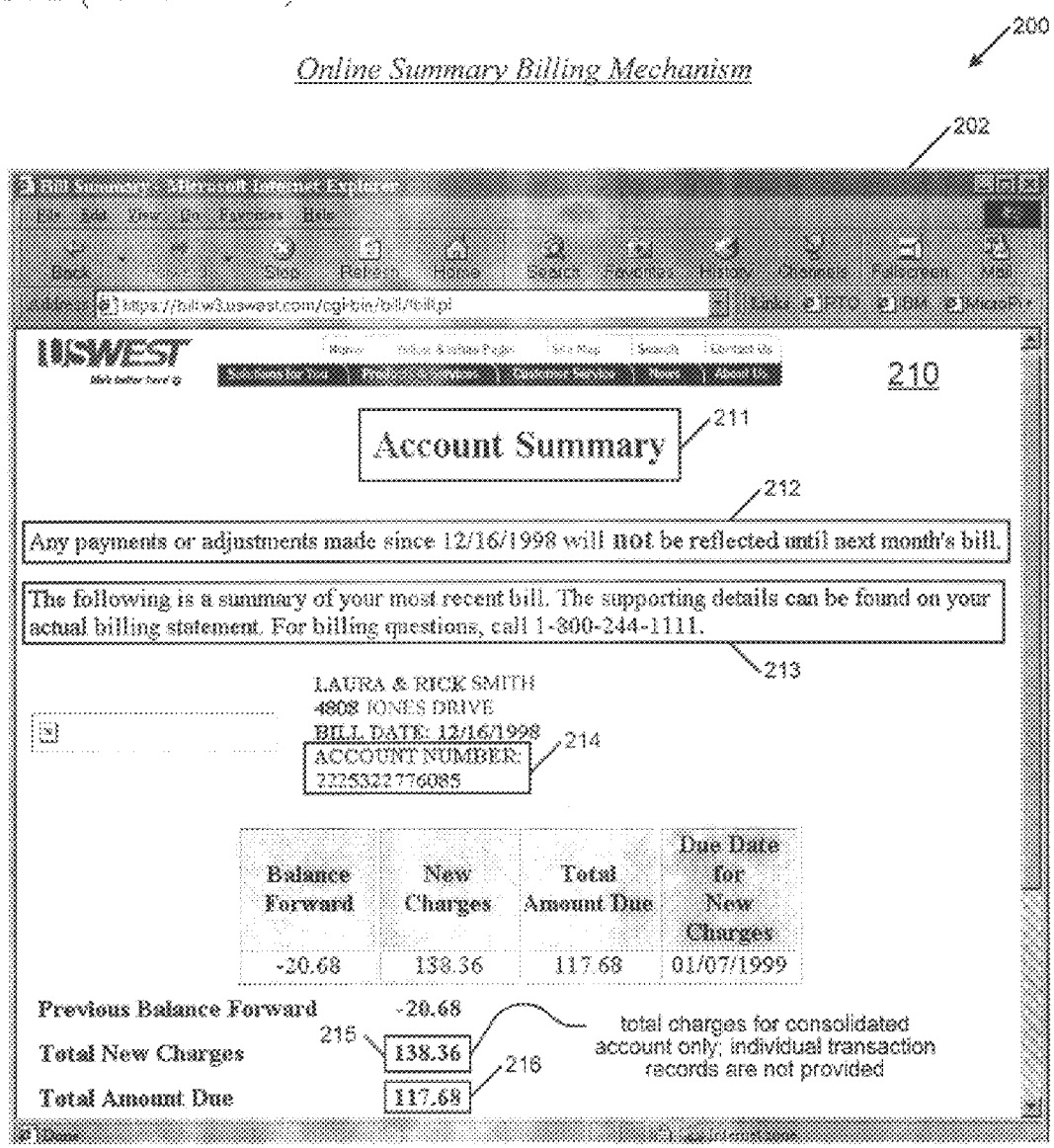
FIG. 2 is a diagram illustrating a related art telecommunications services account summary provided over a thin web client interface.

Referring to FIG. 2, a diagram 200 is presented illustrating a related art telecommunications services account summary 210 provided over a thin web client interface. The diagram 200 depicts a display 202 provided by the thin web client, in this example the Internet Explorer, that features presentation of an account summary web page 210 provided by U.S. West, a telecommunications services provider. Although Internet Explorer is featured as a web browser in this and following drawings, one skilled in the art will appreciate that any HTML-compatible web browser allows display of HTML-authored web pages such as the one 210 depicted in this diagram 200. The account summary web page 210 includes title text 211, latent charges caveat text 212, summary level caveat text 213, account number text 214, total new charges text 215, and total amount due text 216.

Operationally, a user accesses the account summary web page 210 by providing a universal resource locator (URL) to the web browser that corresponds to the service provider, in this case the URL is http://www.uswest.com, which is simply an alias for an Internet Protocol (IP) address that is assigned to a data-centric network server that routes data packets for the service provider. Typically, the user is presented with a sequential series of web pages from which he/she must select options. Once a "view online bill summary" option is selected, he/she is provided with the account summary web page 210 by the data server over the internet. Additionally, most billing systems require some type of identification and authentication data that is provided by the user to preclude unauthorized access to private account information.

A present day billing system typically maintains a small data base of account summary data for all customer accounts. The account summary data is updated as consolidated bills are printed and mailed, but not more frequently. Because of this, the latent charges caveat text 212 is displayed on the account summary web page to warn the user that there may be latent telecommunications transactions that will remain unobservable until the next update of the account summary data. The account number text 214 is provided to indicate that the information displayed relates to a consolidated account rather than individual lines. Both the title text 211 and the summary level caveat text 213 warn the user that the charge information provided via the web page is at a summary level only-no detail is provided at the transaction level. The total new charges text 215 and total amount due text 216 are provided on the page to inform the user of his/her current outstanding balance or credit.

It is significant at this point to note several observations regarding present day online telecommunications billing techniques. First and foremost, they simply serve as a supplemental medium for summarizing information that is otherwise provided to a customer in written form. Second, the information provided by an online account summary 210 is not up-to-date, that is, account transactions that occur prior to generation of the next month's consolidated bill are not reflected on the account summary web page 210. Both of the above limitations serve to impede a customer from accessing useful information regarding his/her account. A present day user desires that up-to-date, or near-real-time, account information be provided online at a level of detail that is sufficient enough to perform use and reconciliation analyses. The present day user, for example, would incorporate near-real-time charges into expense prediction models so that payment assets can be more readily managed. And it is particularly important that businesses be privy to transaction details so that assets of the business can be more effectively allocated. In addition, by monitoring near-real-time charges, alerts may be provided to a user as preset thresholds are reached.

The present invention overcomes both of the limitations cited above by employing a billing server that maintains a transaction level data base that is updated in near-real-time for each customer account. Furthermore, online access to transaction records within the data base is provided to authorized users via a web server. As an additional feature of the present invention, authorized personnel from a service provider are able to monitor and control access to telecommunications and messaging services based upon the detection of prescribed account events. The present invention is more completely described with reference to FIGS. 3 through 9.

Figure 3:
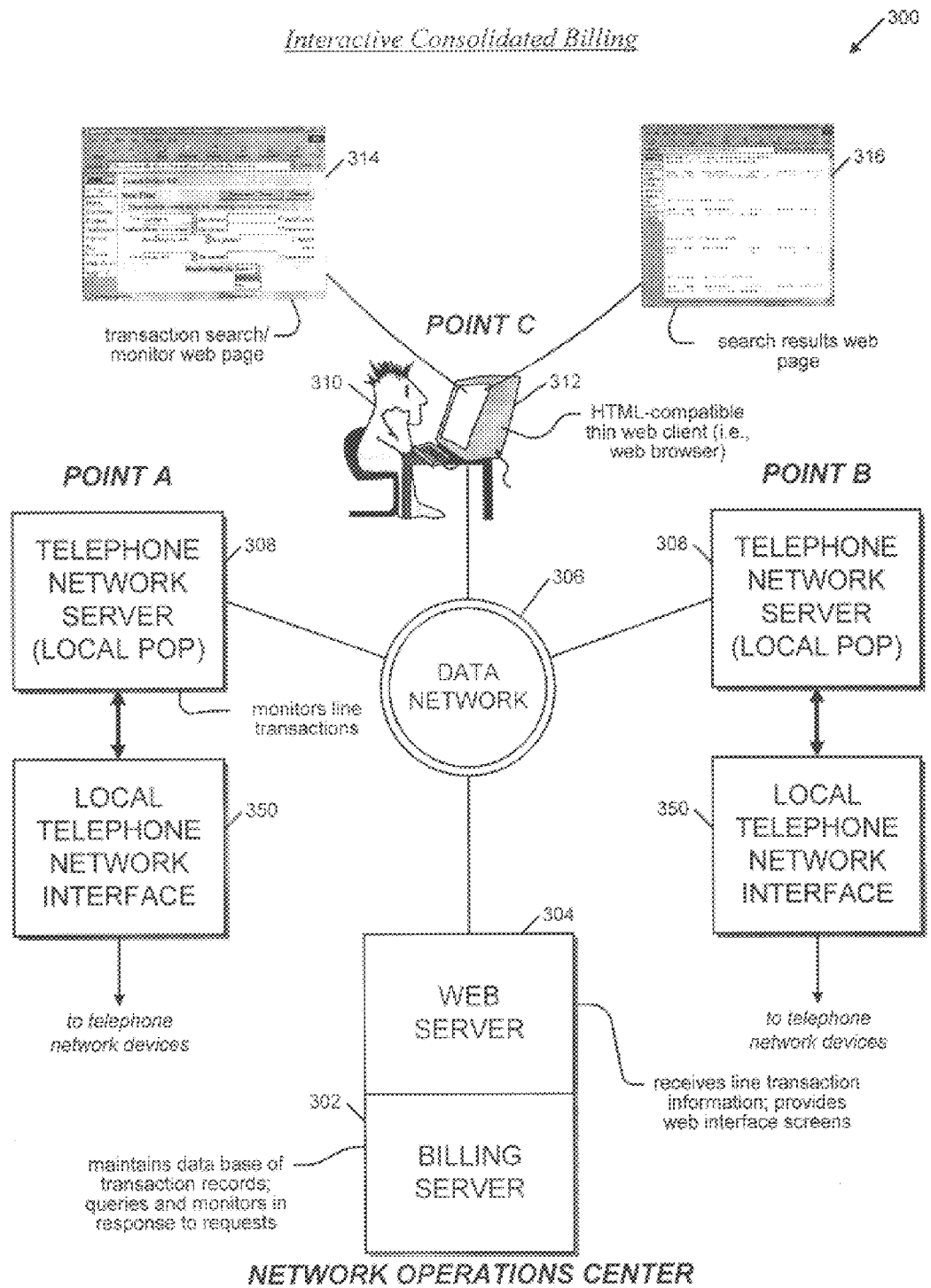
FIG. 3 is a diagram illustrating an interactive, consolidated billing mechanism according to the present invention.

Now referring to FIG. 3, a diagram 300 is presented illustrating an interactive, consolidated billing mechanism according to the present invention. The diagram 300 depicts a billing server 302 and a web server 304 located at a a network operations center. The web server is connected to a data-centric network 306. In one embodiment, the data-centric network 306 is the internet wherein TCP/IP protocol is used to exchange information between computers. In an alternate embodiment, the data-centric network 306 is a private packet-switched network. The diagram 300 also depicts two local telephone switches 350, like those shown in FIG. 1. A telephony-centric network server 308, or local point of presence (pop) 308 is coupled to each local switch 350. The local pops 308 are connected to the web server 304 via the data-centric network 306. The diagram 300 also shows a user computer 312, executing a thin web client application, that is connected to the data-centric network 306. A user 310 is shown viewing his/her detailed telecommunications account information via web pages 314, 316.

In operation, provisioned lines (i.e., telephone numbers that have been assigned to a long distance service) are monitored by the local pops 308. When a telephony-centric network device corresponding to a provisioned line participates in a telecommunications transaction, the corresponding local pop 308 transmits information describing the transaction over the data-centric network 306 to the web server 304 at the network operations center. The information includes calling number, called number, date, time, call duration, and type of call (i.e., direct dialed, calling card, reversed charges, etc.). The web server 304 provides the transaction information to the billing server 302 which, in turn, generates a new transaction record documenting the telecommunications transaction. In addition to the above information, the billing server 302 generates other information for inclusion in the new transaction record such as the place called, account number, and cost of the transaction. The new transaction record is stored within the billing server 302. Hence, up to date telecommunication transaction records are maintained within the billing server.

A user 310 interactively accesses his/her consolidated account information by querying the data base of transaction records in the billing server 304 via a transaction search/monitor web page 314 that is provided by the web server 304 to the user computer 312 over the data-centric network 306. Results of the query, that is, selected transaction records matching the parameters of the query, are provided for display on the user's computer 312 via a search results web page 316. The user 310 is provided with the ability to view transaction details corresponding to his/her consolidated account rather than simple summary level information. In addition, because the user 310 is allowed to query the data base of transaction records, the information he/she receives relating to cost and usage for his/her account is up-to-date.

One skilled in the art will appreciate that the user 310 can be either a customer or an employee of the telecommunications and messaging service provider who is authorized to monitor and control access of the customer to telecommunications and messaging services. The customer's account transactions can be periodically monitored and responses automatically initiated to limit out of pocket expenses for both the customer and the telecommunications and messaging services provider.

Figure 4:
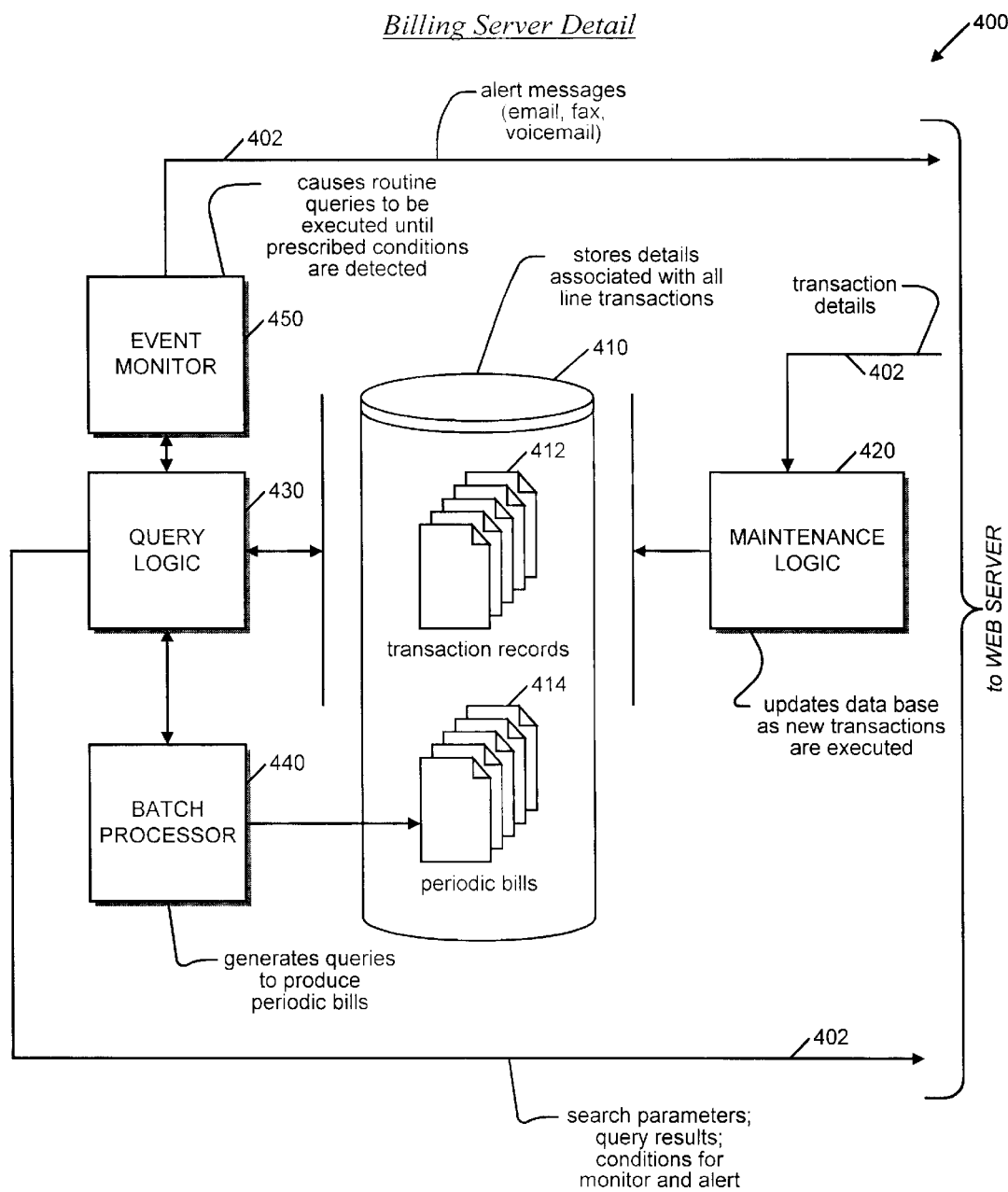
FIG. 4 is a block diagram depicting details of a billing server according to the present invention.

Now referring to FIG. 4, a block diagram is presented depicting details of a billing server 400 according to the present invention. The billing server 400 includes data base logic 410 that stores telecommunications transaction records 412. In one embodiment, the data base logic 410 is a hard disk. The billing server 400 also includes query logic that retrieves selected transaction records 412 from the data base logic 410 in response to a query request provided over bus 402. The billing server 400 also includes maintenance logic 420 that updates the data base logic 410 with a new transaction record 412 when a new telecommunications event has occurred. The billing server 400 additionally has a batch processor 440 that is coupled to the query logic 430. The billing server 400 furthermore includes an event monitor 450 that is coupled to the query logic 450 and bus 402.

Bus 402 provides communication of messages and commands between billing server elements 420, 430 and 450 and a web server (not shown). In one embodiment, bus 402 is a local area network (LAN).

Operationally, transaction details for each new telecommunication event, as described above, are provided to the maintenance logic 420 via bus 402. The maintenance logic generates a new transaction record 412 and causes the record 412 to be stored in the data base logic 410. The query logic 430 is used to retrieve selected transaction records from the data base logic 410. A query is initiated from either a user request provided via the bus 402, the event monitor 450, or the batch processor 440. In one embodiment, query parameters are provided in accordance with the Open Data Base Connectivity (ODBC) set of standards.

When a user or a service provider initiates a query of the data base logic 410 via a web page interface, the query parameters are received via bus 402. The query logic 430 retrieves selected transaction records 412 that satisfy the query parameters and provides these records 412 to a web server (not shown) via bus 402. The web server subsequently inserts the selected transaction records 412 into a search results web page and transmits the web page to the user over the data-centric network (not shown).

The batch processor 440 automatically generates queries periodically for the purpose of formal billing. In one embodiment, formal billing records 414 are also stored within the data base logic 410 so that simple requests to view former consolidated bills can be easily retrieved.

The event monitor 450 causes specified queries to be routinely issued to the query logic 420 until a specified condition is met. An exemplary condition is when a particular dollar, or time threshold is met, for a particular number that is tracked by the event monitor 450. When query results detect that the condition is met, the event monitor 450 then provides an alert message via bus 402 so that a user or the service provider can be notified via a voicemail message, a fax, email message, or even a page. The web server then provides the specified alert. For example, the event monitor 450 may be preset to allow $75/month of long distance calls to a particular out-of-state telephone number. When that amount of billing is reached, the user may preset the event monitor 450 to alert him/her, and possibly to disable any further long distance for the month. An alternative example is very useful to limit out of pocket expenses for the service provider. An account event can be prescribed by the service provider that instructs the event monitor 450 to periodically query the data base logic 410 to detect when a customer account has amassed long distance charges that exceed a specified credit limit. Upon detection of the account event, the event monitor 450 may increase the credit limit by a specified percentage and notify the customer via an email message that his credit limit has been increased.

Figure 5:
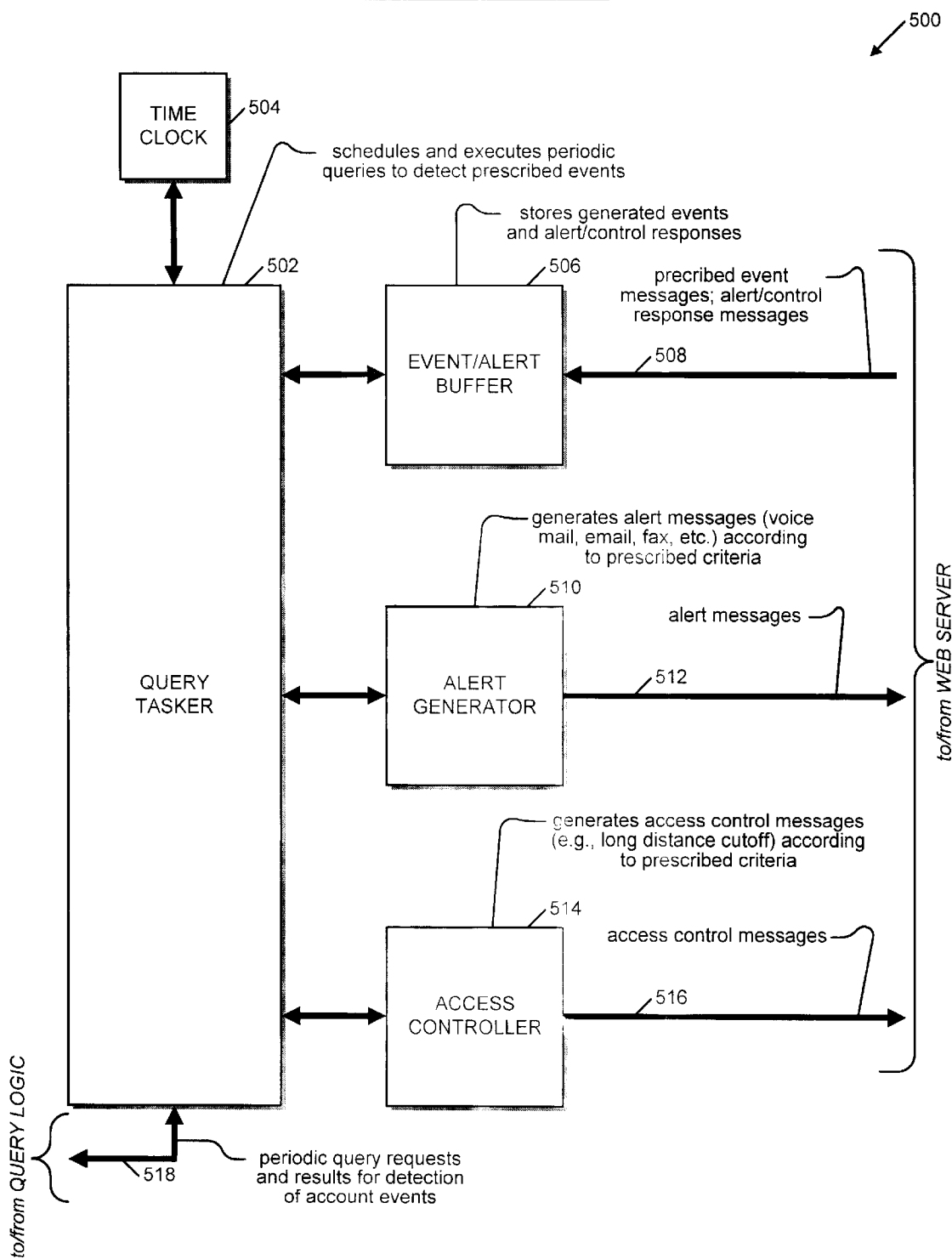
FIG. 5 is a block diagram depicting details of an event monitor according to the present invention.

Now referring to FIG. 5, a block diagram is presented illustrating details of an event monitor 500 according to the present invention. The event monitor 500 includes a query tasker 502 that communicates with a time clock 504. The query tasker 502 communicates with query logic in the billing server (not shown) via bus 518. The query tasker 502 is also coupled to an event/alert buffer 506, an alert generator 510, and an access controller 514. The event/alert buffer 506 communicates with the web server (not shown) via bus 508. The alert generator 510 communicates with the web server via bus 512. The access controller 514 communicates with the web server via bus 516. In one embodiment, buses 508, 512, and 516 are part of a local area network. In another embodiment, the buses 508, 512, 516 are TCP/IP compatible internet data buses. In one embodiment, query tasker 502, the event/alert buffer 506, the alert generator 510, and the access controller 514 are software programs executing on a computer.

Operationally, parameters describing a one-time search or a periodic search (i.e., an account event to be detected), or a corresponding response to be initiated when an account event is detected, are entered by user or service provider on a computer that is executing a web browser on web pages provided by the web server. The parameters are transmitted over the data-centric network and are passed by the web server to the event/alert buffer 506. The query tasker 502 operates in accordance with the time clock 504 to poll the event/alert buffer 506 for scheduling one-time and periodic queries. At prescribed times, the query tasker 502 generates query requests in accordance with associated parameters in the event/alert buffer 506. The query requests are sent to query logic (not shown) via bus 518. Upon execution of a query, results are returned to the query tasker 502 via bus 518. Search results are provided to requestors through the alert generator 510. In addition, the alert generator is also used to generate an alert message to a user or service provider that corresponds to detection of an account event. For example, a service provider may prescribe an event for account XYZ to be 500 percent of an average monthly number of long distance calls performed during a current billing month. In addition, the service provider may prescribe a corresponding response to be executed upon detection of the prescribe account event to consist of two steps: first, to preclude any further access of the customer to long distance services; and second, to send the customer an email message informing him/her that his/her long distance service has been cut off. Upon detection of the account event, the email message to the customer is initiated via the alert generator 510. The access control procedure to cut of the customer's long distance service is performed by the access controller 514. In one embodiment, periodic queries to detect account events are performed at hourly intervals.

Figure 6:
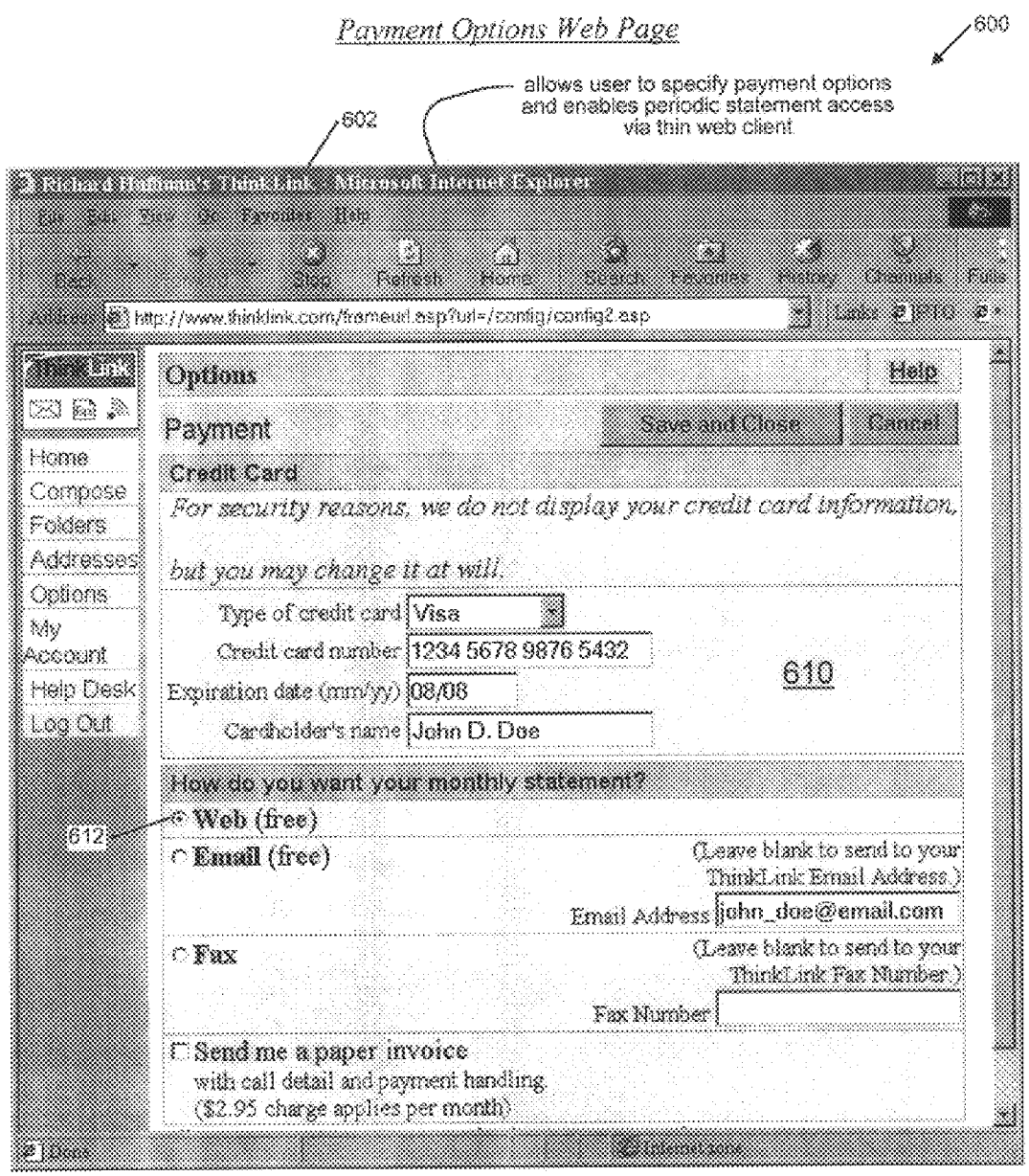
FIG. 6 is a diagram illustrating a payment options web page provided via a thin web client.

Now referring to FIG. 6, a diagram 600 is presented illustrating a payment options web page 610 according to the present invention. Like the web page 210 discussed with reference to FIG. 2, the payment options web page 610 is provided by the web server (not shown) over a thin web client interface. The diagram 600 depicts a display 602 provided by the thin web client. The payment options web page 610 includes a web payment selection radio button 612.

Operationally, a user accesses the payment options web page 610 by providing a universal resource locator (URL) to his/her web browser as was described earlier. To enable automatic payment and access to consolidated account information via the internet, the user is required to select the option specified by the web payment selection radio button, in addition to completing the remaining fields shown on the web page 610. The completed web page 610 is transmitted back to the web server and the billing server in turn updates the account data base to allow the user access to his/her account data online.

Figure 7:
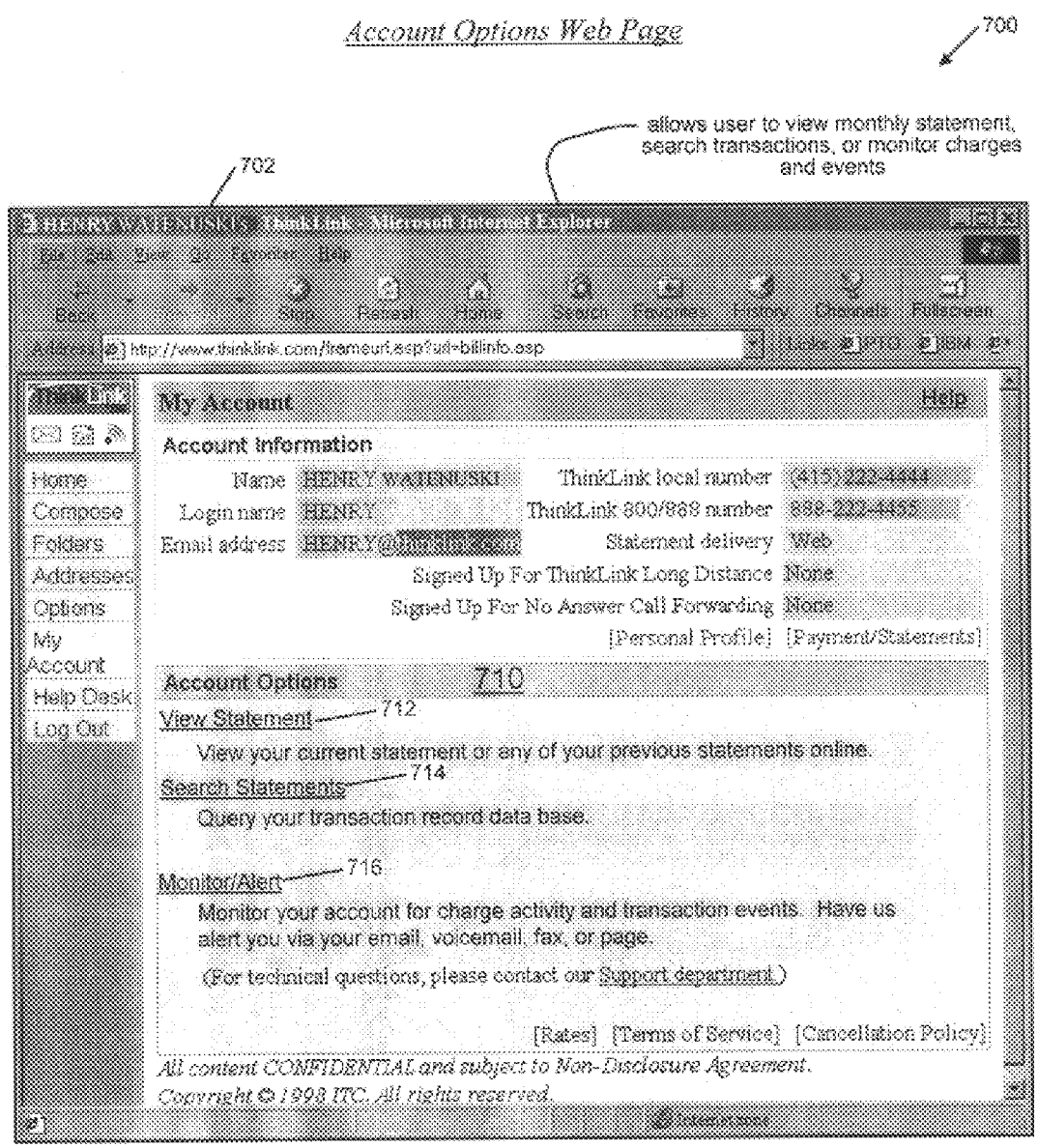
FIG. 7 is a diagram illustrating an account options web page provided via a thin web client.

Now referring to FIG. 7, a diagram 700 is presented illustrating an account options web page 710 according to the present invention. The diagram 700 depicts a display 702 provided by the web browser on a user computer. The account options web page 710 includes a view statement hyperlink 712, a search statement hyperlink 714, and a monitor/alert hyperlink 716.

When the account options web page 710 is displayed on the user computer, the user can select to view a formal billing statement online by selecting the view statement hyperlink 712. The user can opt to query his/her account online by selecting the search statements hyperlink 714. The user can alternatively choose to specify conditions for monitoring his/her account by selecting the monitor/alert hyperlink 716.

Figure 8:
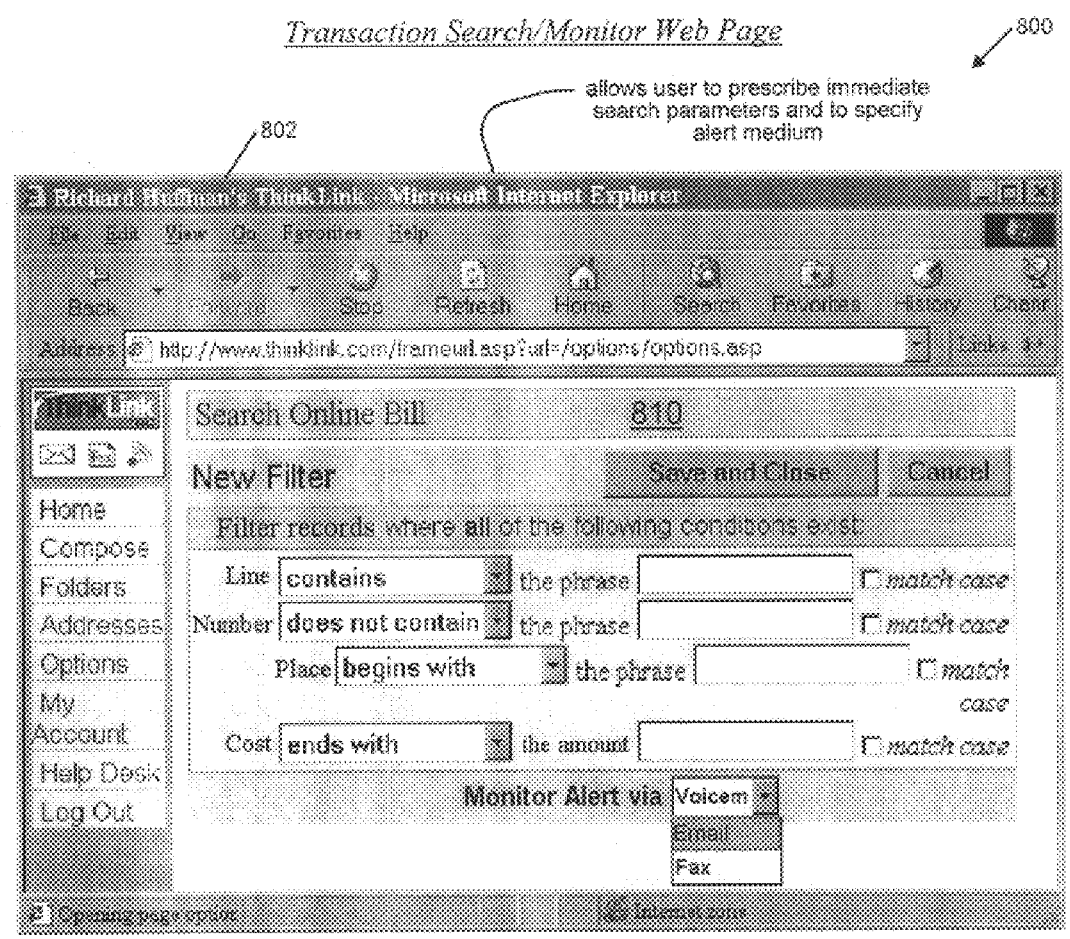
FIG. 8 is a diagram illustrating a transaction search/monitor web page provided via a thin web client.

Now referring to FIG. 8, a diagram 800 is presented illustrating a transaction search/monitor web page 810 according to the present invention. In one embodiment, selecting either the search statements hyperlink 714 or the monitor/alert hyperlink 716 on the web page 710 presented in FIG. 7 brings the user/service provider to this web page 810. In an alternative embodiment, selecting the monitor/alert hyperlink 716 directs the user to an alert configuration web page (not shown). The diagram 800 depicts a display 802 provided by the web browser on a user computer. The transaction search/monitor web page 810 allows the user/service provider to enter parameters for a query to an account. In the embodiment shown in the diagram 800, the user/service provider is allowed to enter query parameters related to line (i.e., calling number), number (called number), place (place called), and cost. Standard structured query language (SQL) operators are provided via drop down menus on the web page 810. In addition, the user/service provider is allowed to modify a medium for alerts via the event monitor. The completed web page 810 is then transmitted to the web server for execution of the prescribed query via the billing server.

Figure 9:
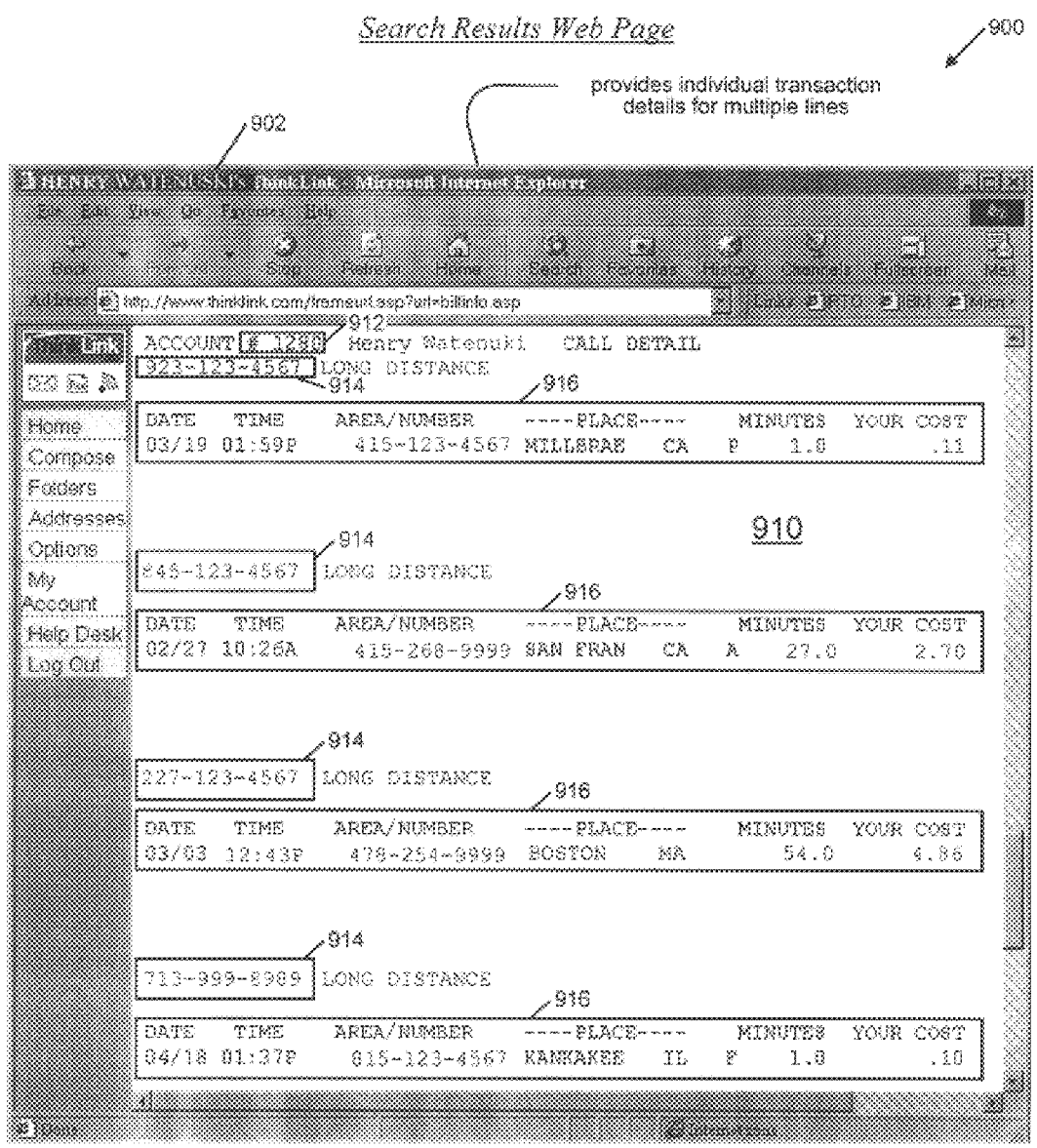
FIG. 9 is a diagram illustrating a search results web page provided via a thin web client.

Now referring to FIG. 9, a diagram 900 is presented illustrating a search results web page 910 according to the present invention. The diagram 900 depicts a display 902 provided by the web browser on a user computer. The search results web page 910 includes an account field 912, calling number fields 914, and transaction record fields 916.

The billing server returns selected transaction records that match parameters provided via the transaction search/monitor web page 810 described above. The selected transaction records are formatted into the search results web page 910 which is then transmitted to the user or server computer over the data-centric network. The search results web page 910 shown in the diagram 900 indicates that four transaction records 916 were selected from the transaction data base that match query parameters. Note that the search results web page restricts access only to account data, as is indicated via the account number field 912. Yet, access to billing records for more than one line is indicated by different entries in the calling number fields 914. It is also notable that individual transactions records 916 are distinguishable when the present invention is employed to view a telecommunications account online. In contrast to summary level information, the transaction details provided in accordance with the present invention allow significant analyses to be performed by a user-without having to wait for a detailed bill to be sent by mail.

Figure 10:
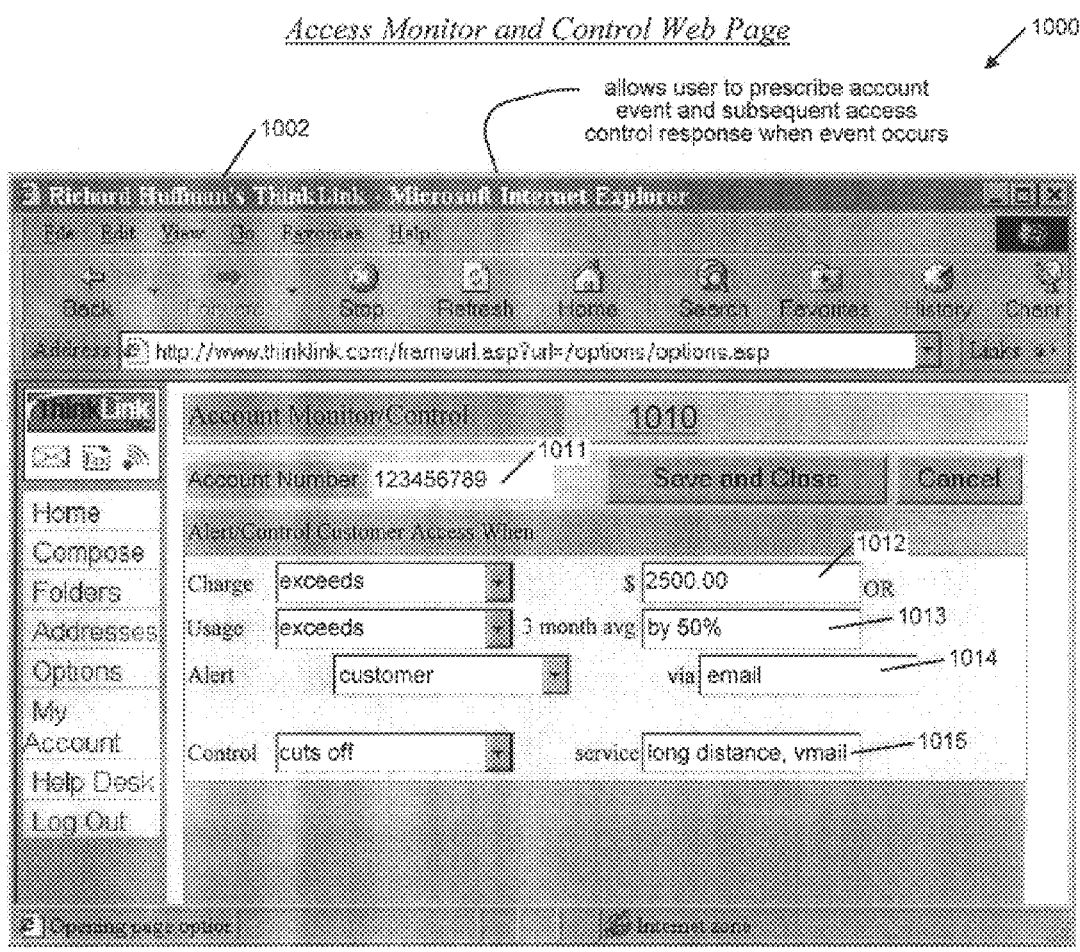
FIG. 10 is a diagram illustrating an access monitor and control web page provided via a thin web client.

Now referring to FIG. 10, a diagram 1000 is presented illustrating an access monitor and control web page 1010 according to the present invention. The diagram 1000 depicts a display 1002 provided by the web browser on a server computer. The access monitor and control web page 1010 includes an account entry field 1011, charge specification field 1012, usage specification field 1013, alert options field 1014, and access control field 1015.

The access monitor and control web page 1010 is used by an authorized employee of a service provider to monitor activity and charges associated with customer accounts and to prescribe corresponding alerts and actions that will be automatically executed when specified account events occur. The number of a customer account is entered in the account number field 1011. An account event corresponding for the customer account is prescribed in the charge and usage specification fields 1012, 1013. The diagram 1000 shows specification of an account event of charges in excess of a $2500 credit limit or usage that exceeds a 3-month average usage on the account by 50%. As described with reference to FIG. 5, the account event is transmitted over the data-centric network and buffered in an event monitor (not shown). A query tasker (not shown) will subsequently poll transaction records for the entered account to detect occurrence of the prescribed account event.

The service provider also enters an alert response and an access control response via fields 1014 and 1015. The entered responses will be executed upon detection of the prescribed account event. The example in FIG. 1000 shows that the customer will be alerted via an email message when his/her charges to the account exceed $2500 or when his/her usage exceeds a 3-month average by at least 50 percent. In addition the entered access control response in field 1015 shows that the customer's long distance and voice mail services will also be cut off when the prescribed account event is detected.

Figure 11:
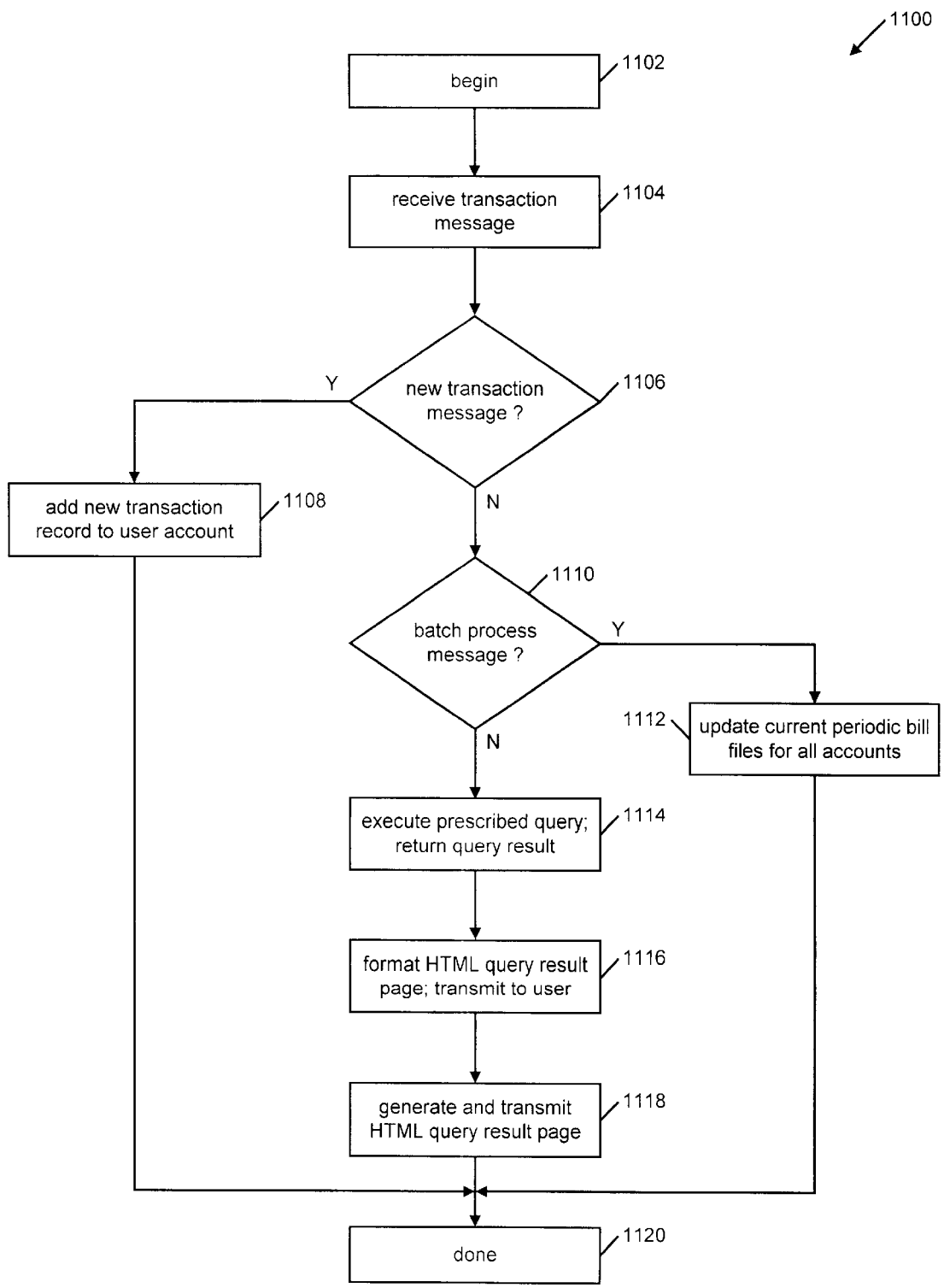
FIG. 11 is a flow chart illustrating a method according to the present invention for providing online access to up to date details and charges corresponding to a telecommunications account.

Now referring to FIG. 11, a flow chart 1100 is presented illustrating a method according to the present invention for providing online access to up to date details and charges corresponding to a telecommunications account.

The method begins at block 1102 wherein a transaction message is provided to a network operations center over a data-centric network. Flow then proceeds to block 1104.

At block 1104, the transaction message is received by a web server in the network operations center. Flow then proceeds to decision block 1106.

At decision block 1106, the transaction message is evaluated to determine if the transaction message corresponds to a new telecommunications event that has occurred. If so, then flow proceeds to block 1108. If not, then flow proceeds to decision block 1110.

At block 1108, the transaction message describing the new telecommunications event is provided to a billing server. The billing server generates a new transaction record for the new telecommunications event based upon details provided by the new transaction message. The new transaction record is inserted into a telecommunications transaction data base in the billing server. Flow then proceeds to block 1120.

At decision block 1110, the transaction message is evaluated to determine if it is a batch process message. If so, then flow proceeds to block 1112. If not, then flow proceeds to block 1114.

At block 1112, the batch process message directs the billing server to generated periodic billing files for all user accounts. As a result, a sequence of queries is performed on the data base to generate bills for each account covering a period prescribed by the batch process message. Transaction records corresponding to each of the sequence of queries are used to generate and store billing information in the data base. Flow then proceeds to block 1120.

At block 1114, it is determined by default that the transaction message is a transaction search message containing search parameters. The transaction search message has been generated in response to a user request for information provided over a data-centric network via a web browser. Consequently, query logic within the billing server executes a query of the data base in accordance with the search parameters. Transaction records are retrieved from the data base that match the search parameters. Flow then proceeds to block 1118.

At block 1118, the retrieved transaction records are formatted into a query result web page and are transmitted over the data-centric network to the user. Flow then proceeds to block 1120.

At block 1120 the method completes.

Now referring to FIG. 12, a flow chart 1200 is presented illustrating a method for controlling access to telecommunications and messaging services according to the present invention via a thin web client.

Flow begins a block 1202 where an account monitor/control web page is transmitted over a data-centric network to a server computer. Flow then proceeds to block 1204.

At block 1204, an account event is prescribed for a customer account by entering parameters into fields of the web page such as credit limit or usage threshold. Flow then proceeds to block 1206.

At block 1206, an alert response and access control response are prescribed that will be automatically executed when the account event is detected. The completed web page is then transmitted over the data-centric network to a centralized billing computer. Flow then proceeds to block 1208.

At block 1208, the billing computer executes periodic queries of a transaction data base containing information related to the prescribed account event. Each time a query is executed, the results are returned. Flow then proceeds to decision block 1210.

At decision block 1210, the results of a query are evaluated to determine is the prescribed account event has occurred. If the results show that the event has occurred, then flow proceeds to block 1212. If the results show that the event has not occurred, then flow proceeds to block 1208 where periodic queries are continued.

At block 1212, because the account event has been detected, the alert response prescribed in block 1206 is executed. Because all telecommunication and messaging services according to the present invention are accomplished over the internet, alert messages are transmitted over the internet regardless of their form. Flow then proceeds to block 1214.

At block 1214, the access control response prescribed in block 1206 is also executed. Flow then proceeds to block 1216.

At block 1216, the method completes.

Although the present invention and its objects, features, and advantages have been described in detail, other embodiments are encompassed by the invention. The present invention has been particularly characterized by access to transaction records via the Internet data-centric network. Although the Internet is widely used today for communication between computers, the present invention is not dependent upon such capability being provided. The data-centric network employed to access a billing server according to the present invention can be embodied as any public or private network utilizing proprietary or leased communication channel assets.

In addition, the present invention has been particularly characterized in terms of specific details that are commonly used to control costs of a telecommunication event such as time, location, and etc. Other examples include: 1) exceeding the number of long distance minutes called in a specified period (e.g., a day, 5 weekdays, a weekend, etc.); 2) long distance calls to countries not specified; and 3) simultaneous attempts to log in under the same user name). In addition to such details, the present invention also comprehends other criteria for charge determination that may require presence in a transaction record such as the type of telephonic device employed to execute a particular transaction event.

Furthermore, the present invention has been specifically described with reference to providing online access to transaction records relating to events that take place over a telephony-centric network between devices having telephone numbers. Yet, improvements in the art may soon prove to allow telecommunication events to transpire between devices having some other form of addressing, such as an IP address. And the events may occur over a data-centric network rather than the telephony-centric network. The present invention comprehends such improvements to the extent that individual transactions can be distinguished within a billing data base and account events can be specified and detected.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. An apparatus for managing access to telecommunications and messaging services, the apparatus comprising:
   query logic, configured to query up-to-date telecommunication transaction records for a user's account to detect an account event, said transaction records each having a transaction cost associated therewith; and
   an event monitor, configured to prescribe said account event, and, upon detection of said account event, to manage access to the telecommunications and messaging services as a function of the transaction cost associated with the transaction record of the detected account event, said event monitor prescribing the account event in response to a command initiated by a user from a remote computer.

2. The apparatus as recited in claim 1, wherein a user prescribes said account event from a remote computer that is executing a thin web client application program.

3. The apparatus as recited in claim 1, wherein fields of said telecommunication transaction records include a calling number, a transaction date, a transaction time, a called number, a called place, a transaction duration, and the transaction cost.

4. The apparatus as recited in claim 3, wherein said account event comprises a logical combination of one or more states of said fields, said logical combination of field states being specified by said user.

5. The apparatus as recited in claim 1, wherein said event monitor manages access to said telecommunications and messaging services by automatically executing a prescribed response when said prescribed account event is detected wherein the prescribed response is in response to a command initiated by the user from the remote computer.

6. The apparatus as recited in claim 5, wherein said prescribed response comprises an alert response.

7. The apparatus as recited in claim 6, wherein said alert response comprises notifying said user that said prescribed account event has been detected.

8. The apparatus as recited in claim 7, wherein said user is notified via any of the following message types: email, voice mail, fax, or page.

9. The apparatus as recited in claim 5, wherein said prescribed response further comprises a control response.

10. The apparatus as recited in claim 9, wherein said control response comprises limiting access of said user to specified telecommunications and messaging services.

11. The apparatus as recited in claim 10, wherein said services comprise long distance service and toll free number service.

12. The apparatus as recited in claim 1, wherein each of said telecommunication transaction records documents a specific telecommunication event.

13. The apparatus as recited in claim 12, wherein said specific telecommunication event comprises a local toll call, a long distance call, or a calling card call.

14. The apparatus as recited in claim 2, wherein said thin web client application program comprises a web browser capable of processing HTML-compatible web pages.

15. The apparatus as recited in claim 14, wherein said web browser is JAVA enabled.

16. An apparatus for managing access to a telecommunications and messaging services system, the apparatus comprising:
   a billing server, configured to maintain up-to-date telecommunication transaction records, and to query said telecommunication transaction records to detect an account event, said transaction records each having a transaction cost associated therewith; and
   a web server, coupled to said billing server, configured to send telecommunication transaction information to said billing server, to prescribe said account event in response to a command from a remote computer configured with a thin web client interface, and, upon detection of said account event, to manage access to the telecommunications and messaging services system as a function of the transaction cost associated with transaction record of the detected account event.

17. The apparatus as recited in claim 16, wherein said account event comprises a logical combination of one or more states of fields of said telecommunication transaction records, said fields including a calling number, a transaction date, a transaction time, a called number, a called place, a transaction duration/and a the transaction cost.

18. The apparatus as recited in claim 16, wherein said web server manages access to the telecommunications and messaging services system by automatically executing a prescribed response when said account event is detected, wherein executing the prescribed response is responsive to a command from the remote computer.

19. The apparatus as recited in claim 18, wherein said prescribed response comprises an alert response.

20. The apparatus as recited in claim 19, wherein said alert response comprises notifying a user that said account event has been detected or notifying a service provider that said account event has been detected.

21. The apparatus as recited in claim 20, wherein said user or said service provider are notified via any of the following message types: email, voice mail, fax, or page.

22. The apparatus as recited in claim 18, wherein said prescribed response further comprises a control response.

23. The apparatus as recited in claim 22, wherein said control response comprises limiting access of said user to services within the telecommunications and messaging services system.

24. The apparatus as recited in claim 23, wherein said services comprise long distance service and toll free number service.

25. The apparatus as recited in claim 22, wherein said control response comprises increasing a credit limit for said user by a specified amount.

26. The apparatus as recited in claim 16, wherein each of said telecommunication transaction records documents a specific telecommunication event.

27. The apparatus as recited in claim 26, wherein said specific telecommunication event comprises a local toll call, a long distance call, or a calling card call.

28. The apparatus as recited in claim 16, wherein the thin web client interface is a web browser capable of processing HTML-compatible web pages.

29. The apparatus as recited in claim 28, wherein said web browser is JAVA enabled.

30. The apparatus as recited in claim 16, wherein said web server is a computer that transmits and receives data packets over a data-centric network to provide telecommunications and messaging services for a user.

31. The apparatus as recited in claim 30, wherein said web server transmits HTML-compatible web pages over said data-centric network to allow a service provider, using said thin web client interface, to prescribe said account event.

32. The apparatus as recited in claim 30, wherein said web server transmits HTML-compatible web pages over said data-centric network to allow said service provider, using said thin web client interface, to prescribe an alert response to be performed upon detection of said account event.

33. The apparatus as recited in claim 30, wherein said web server transmits HTML-compatible web pages over said data-centric network to allow a service provider, using said thin web client interface, to prescribe a control response to be performed upon detection of said account event.

34. The apparatus as recited in claim 30, wherein said web server receives said command over said data-centric network.

35. The apparatus as recited in claim 30, wherein said web server employs TCP/IP protocol to transmit and receive said data packets.

36. The apparatus as recited in claim 16, wherein said billing server maintains said telecommunication transaction records in a database.

37. The apparatus as recited in claim 36, wherein said database is queried by an Open Database Connectivity (ODEC)-compatible query.

38. An account management mechanism for a telecommunications service provider, comprising:
    a billing server, for maintaining up-to-date transaction records, and for managing access to telecommunications and messaging services corresponding to an account, said billing server comprising:
    database logic, for storing said transaction records, wherein said transaction records specify transaction details and charges corresponding to said account; and
    an event monitor, coupled to said database logic, for scheduling queries of said transaction records to detect an account event, and, upon detection of said account event, for initiating a response as a function of the transaction charge corresponding to the transaction record of the detected account event; and
    a web server, coupled to said billing server, for receiving commands over a data-centric network prescribing said account event and said response, wherein said commands are entered by a service provider from a remote computer configured with a web browser.

39. The account management mechanism as recited in claim 38, wherein said web browser is compatible with web pages generated using hypertext markup language (HTML).

40. The account management mechanism as recited in claim 38, wherein said web server is a computer that transmits and receives data packets over said data-centric network to provide said telecommunications and messaging services for a user.

41. The account management mechanism as recited in claim 38, wherein said web server transmits web pages over said data-centric network to allow said service provider to prescribe said account event and said response.

42. The account management mechanism as recited in claim 38, wherein said web server employs TCP/IP protocol to transmit and receive said data packets.

43. The account management mechanism as recited in claim 38, wherein said queries are periodic queries of said transaction records and are ODEC-compatible queries.

44. The account management mechanism as recited in claim 38, wherein said response comprises providing an alert message via email, voice mail, fax, or page.

45. The account management mechanism as recited in claim 38, wherein said response further comprises limiting access to prescribed telecommunications and messaging services.

46. The account management mechanism as recited in claim 38, wherein said commands are generated based on parameters entered by a service provider on a web page hosted by said web server.

47. An apparatus for monitoring and controlling access to telecommunications and messaging services provided over an internet from a server computer that is executing a web browser application, the apparatus comprising:
    a web server, for receiving commands from the server computer prescribing an account event and corresponding response;
    an event/alert buffer, coupled to said web server, for maintaining parameters that describe said account event and parameters that describe said corresponding response;
    a query tasker, coupled to said event/alert buffer, for generating periodic query requests to search an up-to-date telecommunications transaction database to detect said account event, and for initiating a request to execute said corresponding response as a function of the transaction cost associated with a transaction record of the detected account event, said telecommunications transaction database storing transaction records that include transaction costs;
    an access controller, coupled to said query tasker, for receiving said request, and for executing said corresponding response, thereby controlling access to telecommunications and messaging services associated with an account of a user.

48. The apparatus as recited in claim 47, wherein said web server transmits web pages over the internet to allow the server computer to prescribe said account event and said corresponding response, and wherein the user of the server computer determines the account event to be prescribed and the corresponding response to be prescribed.

49. The apparatus as recited in claim 47, wherein said web server is a computer coupled to the internet to transmit and receive data packets over the intermit to provide the telecommunications and messaging services for a the user.

50. The apparatus as recited in claim 49, wherein said web server employs TCP/IP protocol to transmit and receive said data packets.

51. The apparatus as recited in claim 47 wherein said corresponding response comprises alerting said user via email, voice mail, fax, or page.

52. The apparatus as recited in claim 47, wherein said corresponding response further comprises limiting access to telecommunications and messaging services.

53. A method for managing access to telecommunications and messaging services provided over an internet from a server computer that is executing a web browser application, the method comprising:

maintaining up-to-date telecommunications billing records in a database, the telecommunications billing records including individual telecommunication events and associated charges;

prescribing an account event from the server computer and transmitting the prescribed account event to a billing device;

prescribing a response from the server computer and transmitting the prescribed response to the billing device;

querying the database to detect the prescribed account event and determine an associated transaction charge;

transmitting the prescribed response upon detection of the prescribed account event and as a function of the transaction charge associated with the detected account event; and managing access to the telecommunications and messaging services as a function of the prescribed response.

54. The method as recited in claim 53, wherein TCP/IP protocol is used to transmit the prescribed account event and prescribed response over the internet.

55. The method as recited in claim 53, wherein the prescribed response is one or more of the following: alerting a user, alerting the service provider, increasing a credit or access limit for an account, or limiting the user's access to the telecommunications and messaging services.

56. The method as recited in claim 53, wherein the web browser comprises Internet Explorer or Netscape Navigator.

57. The method as recited in claim 53 wherein the prescribed account event comprises a total of long distance charges for one or more of a plurality of telephone numbers, within a specified time period.

58. The method as recited in claim 55 wherein the user and service provider are alerted by email, voice mail, fax, or page.

\* \* \* \* \*

UNITED STATES PATENT AND TRADEMARK OFFICE
CERTIFICATE OF CORRECTION

PATENT NO. : 6,639,975 B1
DATED : October 28, 2003
INVENTOR(S) : Stephen C. O'Neal et al.

It is certified that error appears in the above-identified patent and that said Letters Patent is hereby corrected as shown below:

Column 1,
Lines 20-21, "Messaping" should read -- Messaging --.

Column 18,
Line 40, "and a the transaction" should read -- and the transaction --.

Column 20,
Line 58, "for a the user" should read -- for the user --.

Signed and Sealed this

Third Day of February, 2004

JON W. DUDAS
*Acting Director of the United States Patent and Trademark Office*